United States Patent [19]

Meyer, deceased et al.

[11] 4,045,216
[45] Aug. 30, 1977

[54] DIRECT REDUCTION OF MOLYBDENUM OXIDE TO SUBSTANTIALLY METALLIC MOLYBDENUM

[75] Inventors: Harry W. Meyer, deceased, late of Weston, Conn., by Elizabeth Jane Meyer, executrix; Jerry D. Baker, Ann Arbor, Mich.; William H. Ceckler, Orono, Maine

[73] Assignee: Amax Inc., Greenwich, Conn.

[21] Appl. No.: 627,972

[22] Filed: Nov. 3, 1975

[51] Int. Cl.² .............................................. C22B 34/34
[52] U.S. Cl. ........................................ 75/84; 423/606
[58] Field of Search ...................... 75/84; 423/53, 606

[56] References Cited
U.S. PATENT DOCUMENTS

| | | | |
|---|---|---|---|
| 2,398,114 | 4/1946 | Rennie | 75/84 |
| 3,146,093 | 8/1964 | Foos | 75/84 |
| 3,196,004 | 7/1965 | Kunda | 75/84 |
| 3,833,352 | 9/1974 | Vojkovic | 75/84 |
| 3,865,573 | 2/1975 | Neumann et al. | 75/84 |

*Primary Examiner*—Brooks H. Hunt
*Attorney, Agent, or Firm*—Harness, Dickey & Pierce

[57] ABSTRACT

A continuous process for producing a substantially dense pelletized metallic molybdenum product from an agglomerated molybdenum trioxide containing feed material in which the feed material is continuously charged at a controlled rate into a reactor formed with a first reaction maintained at a controlled first temperature and containing a first hydrogen-containing atmosphere having a controlled composition for effecting the exothermic reduction of molybdenum trioxide to molybdenum dioxide, whereafter the partially reduced pelletized feed is transferred at a controlled rate into a second reaction zone at a controlled higher temperature and incorporating a second hydrogen-containing atmosphere of a controlled different composition to effect an endothermic reduction of substantially all of the molybdenum dioxide to metallic molybdenum, which upon subsequent cooling is recovered as a pelletized product suitable for use in steelmaking, other metal alloy production, melting, chemical reaction operations and the like. The invention further contemplates a continuous single-stage process for producing a pelletized molybdenum dioxide product from a pelletized molybdenum trioxide feed material and a continuous single-stage process for producing a pelletized substantially metallic molybdenum product from a pelletized molybdenum dioxide feed material.

26 Claims, 5 Drawing Figures

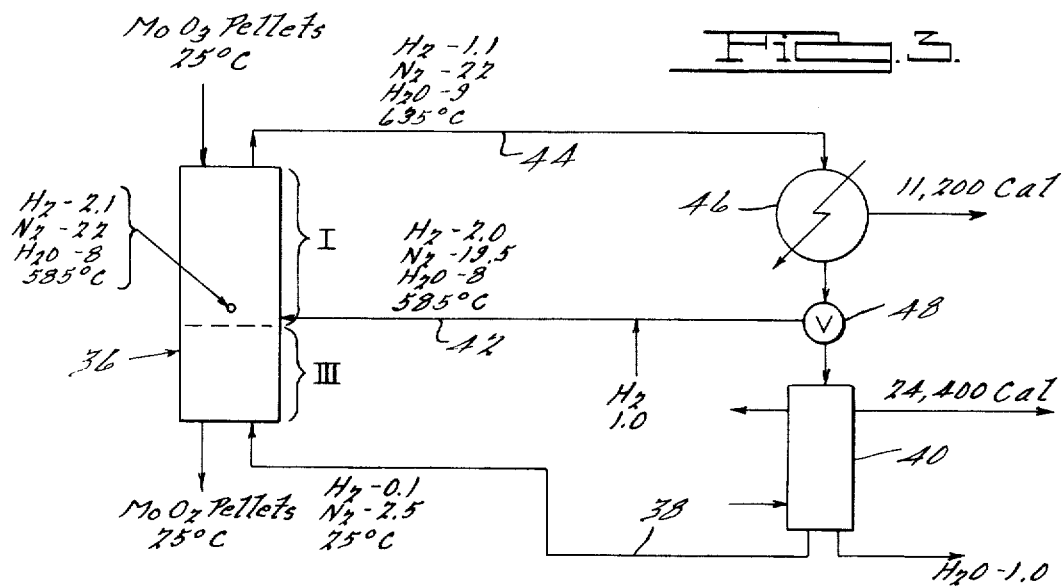
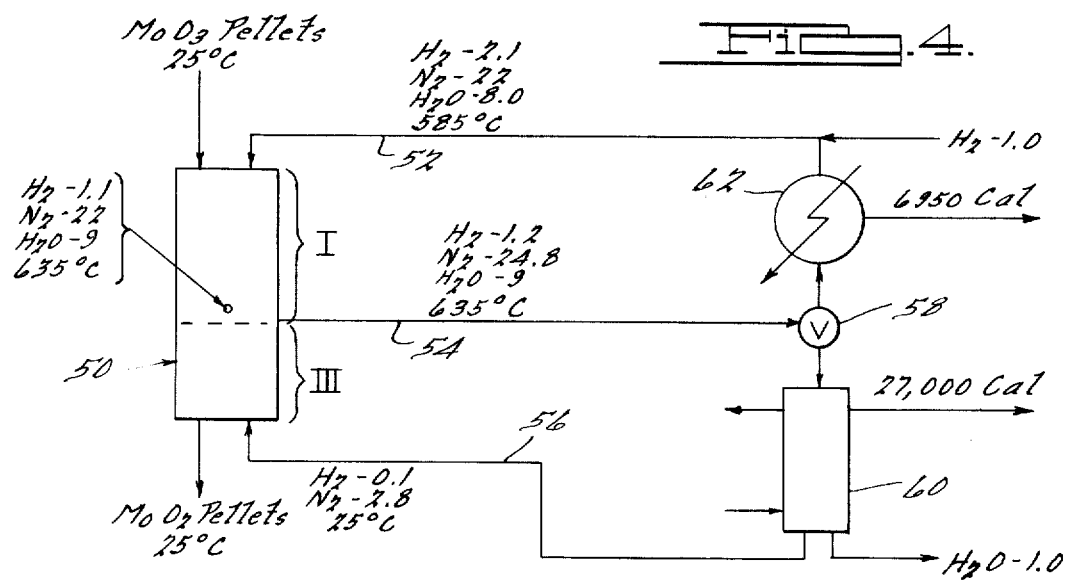
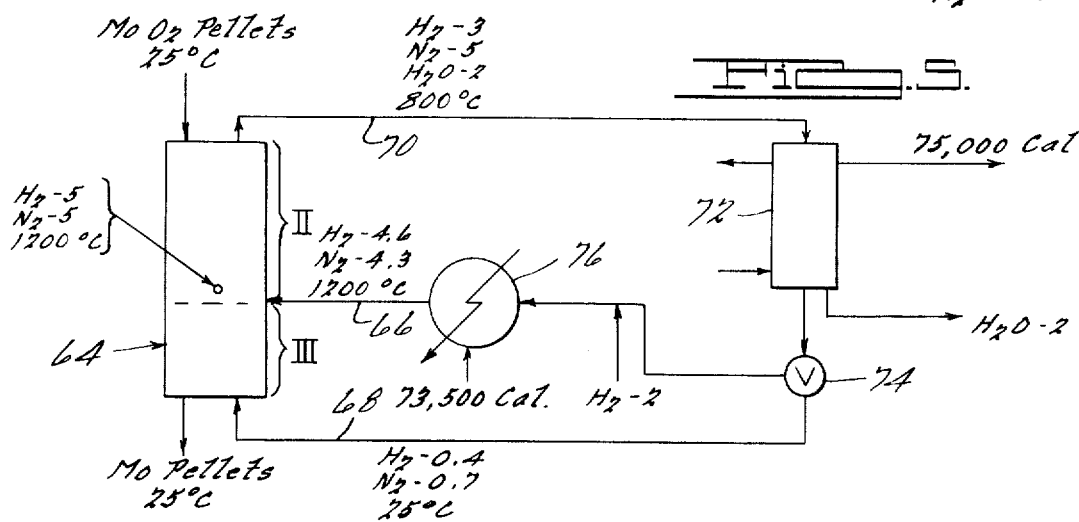

DIRECT REDUCTION OF MOLYBDENUM OXIDE TO SUBSTANTIALLY METALLIC MOLYBDENUM

BACKGROUND OF THE INVENTION

Molybdenum is extensively employed for producing a variety of molybdenum-base alloys and as an alloying agent in other alloy systems for imparting beneficial mechanical and chemical properties thereto. Conventionally, metallic molybdenum is produced by the reduction of molybdenum oxide derived from the roasting of molybdenite ($MoS_2$) at an elevated temperature in the presence of excess oxygen. It has been customary, in accordance with prior art practices, to employ a batchwise multiple-step process for effecting a progressive reduction of a relatively high-grade molybdenum oxide feed material to a comparatively pure metallic molybdenum product suitable for use in the preparation of molybdenum catalysts and reagent grade molybdenum chemical compounds. A typical batchwise process of the aforementioned type is described in U.S. Pat. No. 2,398,114.

A common form of molybdenum which is employed extensively in metallurgical operations is the ferro alloy which is universally produced by batch-type operations either employing a thermit process or employing an electric furnace reduction process. Both of the foregoing techniques are labor and energy intensive, with the thermit process, in particular, posing problems due to environmental considerations.

The present invention overcomes the problems and disadvantages associated with batch-type prior art processes providing an efficient continuous process for directly reducing an agglomerated molybdenum oxide feed material to a pelletized substantially metallic molybdenum product which is of excellent quality and of high density, rendering it eminently suitable for use as an alloying addition agent in steelmaking operations and the like.

Prior art attempts to effect a direct reduction of molybdenum oxide to metallic molybdenum on a continuous basis have heretofore been unsuccessful due to the difficulty of controlling the exothermic and endothermic two-stage reduction reactions to avoid the formation of appreciable quantities of volatile molybdenum oxide and/or a sintering of the agglomerated feed material into a nonfriable mass.

SUMMARY OF THE INVENTION

The benefits and advantages of the present invention are achieved by agglomerating a molybdenum trioxide powdered concentrate, preferably containing more than about 90% by weight molybdenum trioxide, into pellets preferably of a spherical shape and ranging from about ⅜ inch up to about 1¼ inch in size employing a suitable binder, which preferably comprises a mixture of iron oxide powder and bentonite clay. After drying to remove substantially all of the water introduced during the agglomerating operation, the dense hard pellets are introduced into a reaction chamber at a controlled continuous rate and are heated upon entry into a first reaction zone, to a temperature ranging from about 580° C up to 650° C while exposed to a first reaction gas comprising a mixture of an inert carrier gas, such as nitrogen, and containing from about 3 mol percent up to about 10 mol percent hydrogen. The feed rate of the pelletized material and the reaction gas is controlled to provide a stoichiometric excess of hydrogen to effect an exothermic reduction of substantially all of the molybdenum trioxide in the pellets to molybdenum dioxide during the course of their travel through the first reaction zone, and to extract the exothermic heat produced so as to maintain the pelletized charge within the first reaction temperature range. The partially reduced pellets are continuously transferred from the outlet of the first reaction zone into a second reaction zone at a controlled rate in which they are heated to a second reaction temperature above about 900° C, and preferably from about 1100° C to about 1300° C, while exposed to a second reaction gas consisting of a mixture of an inert carrier gas containing above about 20 mol percent hydrogen. The rate at which the partially reduced pellets pass through the second reaction zone and the flow rate of the second reaction gas are controlled so as to provide a stoichiometric excess of hydrogen to effect an endothermic reduction of substantially all of the molybdenum dioxide to metallic molybdenum and to maintain the temperature of the reaction bed above about 900° C. The substantially completely reduced pellets are continuously transferred from the outlet end of the second reaction zone into a third zone provided with a protective nonoxidizing atmosphere to effect a stabilization and a cooling of the metallic pellets to a temperature below about 200° C, whereafter the pellets are recovered as a substantially metallic molybdenum product. The term "substantially metallic molybdenum product" encompasses a pelletized product in which essentially all of the molybdenum is in the metallic state in combination with impurities such as alumina, silicon dioxide and other oxides normally present in the original feed material which are not reduced in the reaction chamber.

In accordance with a preferred embodiment of the present process, the reaction gases are comprised of controlled mixtures of nitrogen, hydrogen and water vapor and pass in countercurrent fashion through the downwardly moving bed of pelletized feed material with the effluent from the second reaction zone passing directly into the lower end of the first reaction zone and in admixture with a supplemental inert gas mixture at a controlled temperature to reduce the quantity of hydrogen to a desired lower level and to further remove the exothermic heat of reaction in the first reaction zone to a temperature level below that at which appreciable volatilization of the nonreduced molybdenum trioxide occurs. The reaction gases from the reactor are recycled after treatment, heating and/or cooling and with the addition of a controlled quantity of make-up hydrogen so as to provide a substantially closed-loop system.

It is also contemplated that the continuous two-stage process can be practiced as individual single-stage processes for producing a pelletized molybdenum dioxide product from an agglomerated molybdenum trioxide feed material under the same conditions employed in the first reaction zone, as well as for producing a pelletized substantially metallic molybdenum product from a pelletized molybdenum dioxide feed material under conditions similar to those employed in the second reaction zone of the continuous two-stage process.

Further benefits and advantages of the present invention will become apparent upon a reading of the description of the preferred embodiments taken in conjunction with the accompanying drawings.

BRIEF DESCRIPTION OF THE DRAWINGS

FIG. 3 comprises a schematic flow diagram of a single-stage countercurrent flow reduction of molybdenum trioxide to molybdenum dioxide in accordance with an alternative embodiment of the invention;

FIG. 4 comprises a schematic flow diagram of a single-stage co-current flow reduction of molybdenum trioxide to molybdenum dioxide; and FIG. 5 comprises a schematic flow diagram of a countercurrent flow reduction of molybdenum dioxide to metallic molybdenum in a single-stage reduction process in accordance with still another embodiment of the present invention.

DESCRIPTION OF THE PREFERRED EMBODIMENTS

Figure 1:
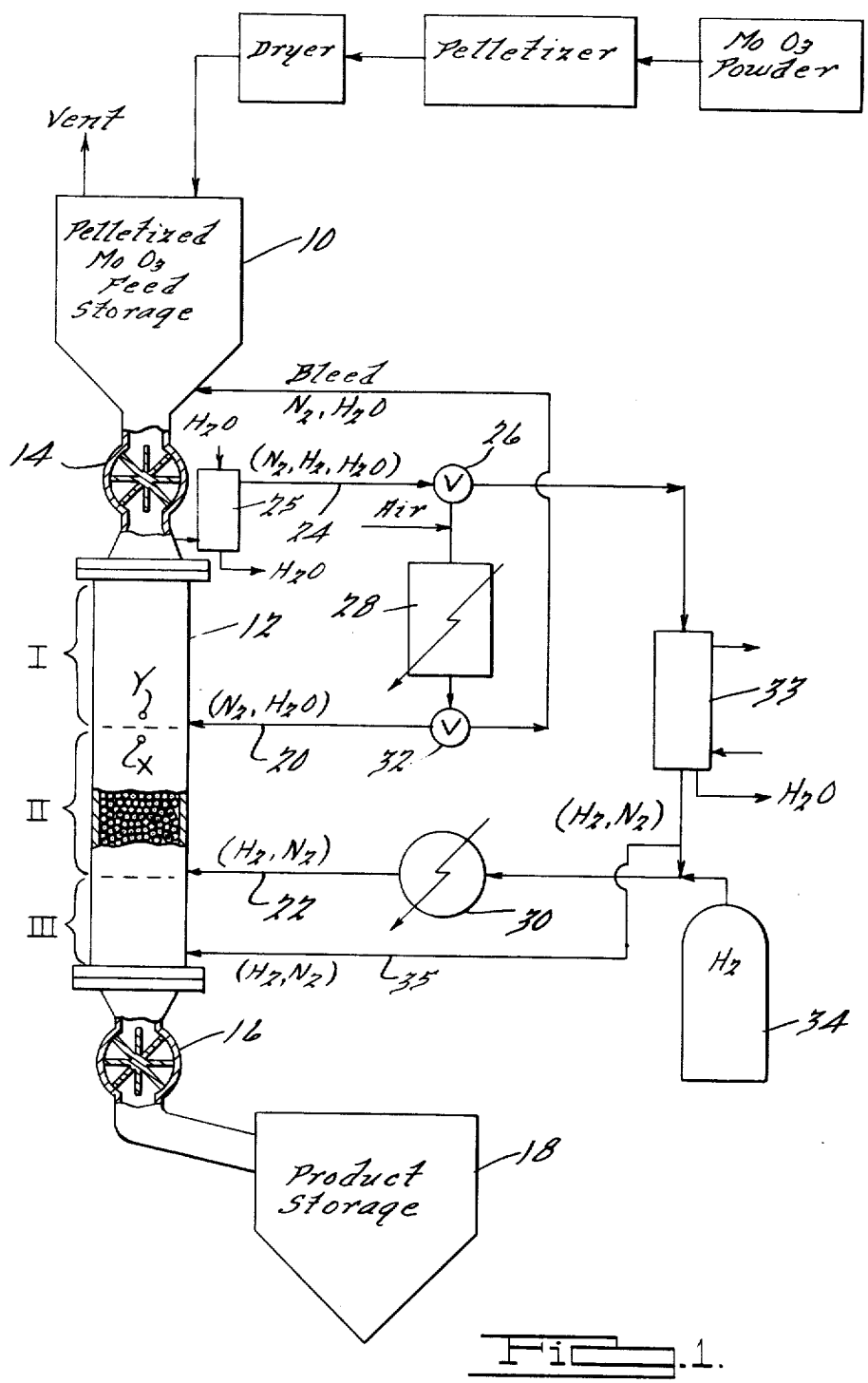
FIG. 1 comprises a schematic flow diagram of the direct reduction process in accordance with a preferred embodiment of the present invention.

The important steps of the process in accordance with one embodiment of the present invention are illustrated in the flow diagram comprising FIG. 1 and include providing a finely-particulated free-flowing powder composed predominantly of molybdenum trioxide which is agglomerated employing a suitable pelletizing apparatus, whereafter pellets of a controlled size range are dried and charged into the upper end of a hopper 10 disposed above a shaft-type reactor 12. The pelletized molybdenum oxide feed material is continuously withdrawn from the base of the hopper at a rate controlled by a star or paddle-type feeder mechanism 14 and enters the upper end of the reactor defining a first reaction zone indicated at I. The pelletized feed material passes downwardly in a continuous manner through the action of gravity through a second reaction zone II, and finally, into a third reaction zone III, at which a stabilization and cooling of the reduced pellets is effected which are continuously discharged from the base of the reactor at a rate controlled by a star or paddle feeder mechanism 16 and are transferred to a product storage hopper 18.

A reaction gas containing a controlled quantity of hydrogen is introduced into the reactor at a position adjacent to the bottom end of reaction zone II, which passes upwardly in a countercurrent manner through the downwardly moving porous bed of feed material and a second reaction gas mixture is added at a position adjacent to the bottom of reaction zone I for effecting a further dilution of the upwardly flowing gases so as to provide the desired hydrogen concentration of the reaction gases passing upwardly through reaction zone I. The gases are withdrawn from the upper end of the reactor and are recycled in a manner to adjust their composition and temperature in a manner and for the purposes subsequently to be described.

The molybdenum trioxide powder feed material may comprise any finely-particulated free-flowing powder concentrate composed predominantly of molybdenum trioxide, and preferably consists of a so-called technical grade oxide concentrate containing at least about 90% by weight molybdenum trioxide and having an average particle size of less than about 100 mesh (147 microns) to as small as about 1 micron. Molybdenum oxide concentrates of the foregoing type are conventionally produced by roasting molybdenite ($MoS_2$) concentrates at an elevated temperature, such as 600° C, in the presence of excess air in a multiple-hearth furnace, such as a Herreshoff, McDougall, Wedge, Nichols, etc. Any agglomerates formed during the roasting operation can be readily removed by subjecting the roasted concentrate to a preliminary grinding operation. The majority of technical grade roasted concentrates commonly contain 94%-95% by weight molybdenum trioxide, with the balance composed predominantly of silicates and other contaminating constituents present in the original molybdenite ore body. Higher purity molybdenum trioxide feed materials can be produced by additional mineral dressing of the original concentrate, or, alternatively, by chemical processing techniques including dissolution, precipitation, crystallization, filtration and drying or calcination to reduce the concentration of contaminating constituents therein. It is also contemplated that molybdenum oxide concentrates of a higher degree of purity can be employed to provide a metallic molybdenum pellet product of the requisite purity. Accordingly, molybdenum oxide concentrates containing upwards of 99% molybdenum oxide can be employed which are produced by the air roasting of relatively pure molybdenite concentrates containing less than about 1% acid insolubles, or alternatively, the roasted molybdenum oxide concentrate can be subjected to further purification processes of the types known in the art prior to the agglomeration step, as may be desired.

In any event, the molybdenum oxide powder is agglomerated into pellets preferably of a spherical configuration and ranging in diameter from about ⅛ inch up to about 1¼ inch employing suitable binders, such as starches, gelatins, sugars, molasses, etc., which are adapted to volatilize during the direct reduction reaction in further combination with supplemental binding agents, such as iron oxide, bentonite clay, or the like, to provide pellets which are substantially dense and of sufficient strength to withstand the pressure and temperature conditions to which they are subjected during their storage, handling and passage through the reactor. A particularly satisfactory binder composition providing pellets of unexpected strength is comprised of from about ½% to about 2% iron oxide, ($Fe_2O_3$); from about ¼% to about 1% bentonite clay, ($Al_2O_3 \cdot SiO_2 \cdot H_2O$); and the balance molybdenum oxide concentrate in combination with an aqueous solution of molasses in an amount sufficient to produce pellets of adequate green strength to enable handling thereof through a subsequent drying operation. Appropriate proportions of the iron oxide and bentonite clay powders are preliminarily dry-mixed or blended with the molybdenum oxide feed material forming a uniform mixture to which the aqueous molasses solution is subsequently added in the agglomerating apparatus, such as a disk or drum-type pelletizer producing pellets of the desired size range. The resultant green pellets can be air-dried but preferably are transferred to a dryer in which they are heated to an elevated temperature, such as from about 100° C to about 110° C for a period of time sufficient to remove the residual water therein.

In accordance with a preferred practice, 98.5% of a technical grade molybdenum oxide powder containing in excess of 90% molybdenum trioxide and having an average particle size ranging from less than 100 mesh to 1 micron is dry-blended employing a pebble mill blender with 1% iron oxide powder and ½% bentonite clay. The resultant dry powder mixture is pelletized on a disk-type pelletizer employing an aqueous molasses solution comprised of approximately 50% water and 50% molasses at a ratio of from 6–8 pounds solution for each 100 pounds dry powder blend. Spherical pellets are produced which preferably range in size from bout ⅛ inch up to about ⅜ inch in diameter and are subsequently dried at 110° C.

It has been found that size and, to a lesser degree, the configuration of the pellets are important in achieving a satisfactory control of the reduction reaction and to obtain a pelletized product which is substantially completely reduced. Spherical pellets of a size of about ⅜ inch to 1¼ inch are preferred. Spherical pellets of a size generally less than about ⅜ inch are unsatisfactory due to the reduced porosity of the reaction bed, which in turn restricts the gas flow, thereby preventing adequate removal of the exothermic heat generated during the first stage of the reduction reaction. On the other hand, spherical pellets of a size in excess of about 1¼ inch require inordinate resident periods in the second reaction zone to achieve complete reduction of the pelletized feed material and causes difficulty in removing the exothermic heat of reaction from the pellets in the first reaction zone. It is also contemplated that the feed material can be agglomerated into pellets or briquettes of a configuration other than substantially spherical, such as, for example, pillow-shaped briquettes, cylinders, or the like, which are controlled in size so as to provide satisfactory bed porosity and free-flowing characteristics and mobility of the pelletized reaction bed as it moves downwardly through the reactor for the same reasons and considerations as previously described in connection with the spherical pellets. Regardless of the specific shape and size of the pelletized feed material, it is usually preferred that all of the pellets be of substantially the same configuration and size so as to provide a reaction bed of substantially uniform porosity and to avoid channeling of the reaction gases.

Referring again to FIG. 1, the pelletized feed passes downwardly from the base of the hopper 10 at a rate controlled by the star feeder 14 into the upper end of the reactor 12 in which it is preheated by the upward countercurrent flow of reaction gases. The paddle wheel of the star feeder 14 is connected to a suitable variable speed drive system to enable control of the rate at which the pelletized feed enters the reactor and its operation is coordinated with the operation of the feeder mechanism 16 at the base of the reactor to maintain the reaction chamber substantially filled with pellets. The paddle wheels in the feeder mechanism 14 and 16 also serve as valves preventing entry of air into the reaction chamber.

The pelletized charge, on passing downwardly through the first reaction zone, is heated by the rising countercurrent reaction gas to a temperature at least about 580° C up to a temperature of about 650° C, and preferably within a temperature range of about 600° C to about 640° C. Temperatures below about 580° C are undesirable due to the slow rate at which the exothermic reduction reaction takes place, while temperatures above about 650° C cause volatilization of the relatively volatile molybdenum trioxide constituent, which has a tendency to sublime on cooler portions of the pelletized charge and the surfaces of the reactor, forming encrustations which interfere with the porosity and mobility of the reaction bed. Particularly satisfactory results are obtained by controlling the temperature of the reaction bed in the first reaction zone within a range of 610° C to 630° C. Maintenance of the appropriate temperature range is achieved by a careful control of the composition, temperature and flow rate of the reaction gas and the rate of feed of the pelletized charge, whereby the exothermic heat of reaction is removed, avoiding localized hot spots. The partial reduction of the pelletized feed in the first reaction zone proceeds in accordance with the following equation:

$$MoO_3 + H_2 \rightarrow MoO_2 + H_2O + \text{heat}$$

The reaction gas in zone I comprises a carefully controlled mixture of an inert carrier gas, which serves as a heat transfer medium for removing the exothermic heat of reaction, preventing a runaway reaction, in combination with a controlled quantity of hydrogen as the reductant, which may range from about 3 mol percent up to about 10 mol percent, and preferably from about 5 mol percent to about 7 mol percent of the reaction gas.

The maintenance of the appropriate temperature range within the first reaction zone is preferably achieved by maintaining the composition and flow rate and the inlet temperature of the reaction gas substantially constant and varying the rate at which the pelletized feed enters the upper end of the reaction zone I by manipulation of the star feeder mechanism 14. Appropriate adjustments in the feed rate can be made by monitoring the temperature of the spent reaction gases leaving the top of the first reaction zone or the temperature of the pellets themselves. As the temperature rises toward the upper permissible limit, the rate of feed is proportionately reduced or temporarily halted and conversely, as the temperature approaches the lower limit, the rate of feed is proportionately increased.

The term "inert carrier gas", as herein employed, refers to a gaseous medium which is nonreactive with the feed material and reduction products under the conditions present in the reaction chamber. While nitrogen and water vapor constitute the preferred components of the carrier gas, it is also contemplated that commercially pure argon and helium can be employed. While carbon dioxide and carbon monoxide can also be employed as an inert carrier gas, careful control must be exercised to avoid the formation of molybdenum carbide and for this reason, the use of carbon dioxide and carbon monoxide is less desirable. Either carbon dioxide or carbon monoxide by itself in combination with hydrogen can be employed for the reaction gas in zone I due to the absence of any metallic molybdenum. In zone II, however, carbon monoxide and carbon dioxide cannot be employed individually due to the catalyzing effect of the metallic molybdenum present. Controlled combinations of carbon dioxide and carbon monoxide at a stoichiometric ratio of 1:1 can be employed in reaction zone II under the elevated temperature conditions previously described without any appreciable formation of molybdenum carbide.

The flow rate of the reaction gas upwardly through the first reaction zone is also controlled to provide a stoichiometric excess of hydrogen required in accordance with the foregoing reduction reaction, which may range upwards of a molar ratio of hydrogen-to-molybdenum trioxide of 10:1, but preferably is controlled within a range of about 1.5:1 to about 3:1. The reaction mixture within the first reaction zone is comprised of a mixture of the reaction gas passing upwardly from the second reaction zone, containing residual unreacted hydrogen and an inert gas mixture composed of nitrogen and water vapor at a controlled temperature discharged through a suitable sparger connected to a supply line 20, as schematically indicated in the drawing, at a position adjacent to the lower portion of the first reaction zone. The temperature and the quantity of inert carrier gas entering the reactor through the supply line 20 is controlled in consideration of the composition and temperature of the reaction gas passing upwardly from the second reaction zone so as to provide the desired reaction bed temperature and hydrogen concentration in the first reaction zone within the limits as hereinabove set forth.

The molybdenum trioxide constituent of the pelletized charge is substantially completely converted to molybdenum dioxide during the course of its travel downwardly through the first reaction zone. The charge thereafter enters the upper end of the second reaction zone II, in which it is heated to a higher temperature by the upward counterflow of the reaction gases in the second reaction zone to a temperature above about 900° C. At temperatures below about 900° C, no appreciable reduction of molybdenum dioxide to metallic molybdenum occurs, and it is accordingly preferred to employ temperatures generally in excess of 1000° C, and preferably from about 1100° C to about 1300° C. While temperatures above about 1300° C can be employed in consideration of the physical limitations of the structural materials used in fabricating the reactor and associated equipment, temperatures higher than 1300° C are undesirable due to the necessity of employing an excess quantity of diluent from supply line 20 to effect a reduction of the reaction gas to below about 650° C upon entry into reaction zone I.

A substantially complete reduction of the molybdenum dioxide in the pelletized feed is effected during the course of the travel of the pellets downwardly through the second reaction zone in accordance with the following reaction equation:

$$MoO_2 + 2H_2 + \text{heat} \rightarrow Mo + 2H_2O$$

As noted, the second stage reduction reaction is endothermic such that the reaction gas introduced via a supply line 22 at a position adjacent to the lower end of the second reaction zone is preheated to an elevated temperature in order to provide sufficient heat capacity for heating the pelletized charge to a temperature above 900° C, as well as to supply the endothermic heat of reaction. The reaction gas entering through the supply line 22 is preferably comprised of an inert carrier gas such as nitrogen in combination with hydrogen. The concentration of hydrogen may be as low as about 20 mol percent, and preferably is controlled within a range of from about 40 mol percent to about 60 mol percent. While the second zone reaction gas may be relatively high in hydrogen, the use of hydrogen in quantities in excess of about 80 mol percent is undesirable for economic reasons in those situations in which the sensible energy of the reaction gases is employed as the principal source of heat for the endothermic reaction in zone II. In order that the inlet temperature of these gases be at a resonable operating level within the restrictions of conventional materials of construction, it is necessary that the ratio of gas flow to solid flow be controlled within a range of about 10 mols of gas for each mol of molybdenum dioxide. It is more economical to supply this sensible energy in the form of a mixture of hydrogen and an inert carrier gas than to supply it in the form of pure hydrogen. The flow rate of the reaction gas is controlled to provide a stoichiometric excess of hydrogen as required for the reaction in both the first and second reaction zones, and preferably is controlled within a range slightly in excess of 2:1 up to about 4:1.

The mass flow of the reaction gases upwardly through the downwardly moving pelletized reaction bed are controlled so as to provide a residence time of the feed material in the first reaction zone of from about five minutes to about three hours, and preferably from about one-half to about one hour, and a residence time in the second reaction zone of from about 15 minutes to about four hours, and preferably from about 30 minutes to one hour. Upon passing from the lower end of the second reaction zone, the reduced metallic molybdenum pellets enter a stabilization zone, indicated at III in FIG. 1, in which they are gradually cooled, while in a protective atmosphere, to a temperature below that at which no appreciable oxidation occurs upon their exposure to air, such as below about 200° C. The cooled pellets are metered from the base of the reaction chamber by the feeder mechanism 16 and are conveniently stored in the hopper 18.

The closed-loop system of the reaction gases, as depicted in FIG. 1, produces only minimal quantities of waste effluents and is substantially self-sustaining from an energy basis in combination with the make-up hydrogen added to the system. As shown, the spent reaction gases leaving the upper end of the reactor through an exhaust line 24 are comprised of nitrogen as introduced through the supply lines 20 and 22, water vapor as formed during the reduction reaction and as added through the supply line 20 and residual unreacted hydrogen. The spent reaction gases also contain volatile thermal decomposition products of the organic binder employed in forming the agglomerated feed material and those substances can be readily removed in a water scrubber 25 disposed in series in the exhaust line 24. The scrubbed reaction gases thereafter pass to a proportioning valve 26 in which the major portion thereof, usually approximately 80% thereof, is transferred to a nitrogen generator 28 and is admixed with air in an amount to provide a stoichiometric quantity of oxygen for reaction with the hydrogen present such that the effluent thereof consists essentially of a mixture of nitrogen and water vapor. The heat generated in the nitrogen generator 28 is recovered and employed for preheating the reaction gases passing through a heat exchanger 30 in the supply line 22 for heating the hydrogen-nitrogen reaction mixture to the appropriate elevated temperature. The exhaust gases from the nitrogen generator 28 enter a proportioning valve 32 in which a quantity of the nitrogen-water vapor mixture is bled off in direct proportion to the mols of nitrogen introduced by the air required for combustion of the hydrogen which is employed for purging the feed storage hopper 10 of air and subsequently is harmlessly discharged through a vent.

The second proportion of the spent reaction gases is transferred from the proportioning valve 26 to a condenser 33 in which the gas is chilled to effect a condensation of the major proportion of water therein which is removed and discharged to waste, while the effluent from the condenser consisting essentially of nitrogen and residual hydrogen is admixed with make-up hydrogen from a storage tank 34 to adjust the hydrogen concentration within the desired ranges for the second reaction zone. As shown in FIG. 1, a small portion of the effluent from the condenser consisting predominantly of nitrogen is introduced into zone III of the reactor by supply line 35 to facilitate a controlled cooling of the metallic molybdenum pellets in a nonoxidizing protective atmosphere to a temperature generally below about 200° C. The quantity of the nitrogen-hydrogen bleed introduced into zone III by supply line 35 is relatively small and does not appreciably affect the composition of the reaction gases in zones I and II, although appropriate allowances therefor can be made.

Figure 2:
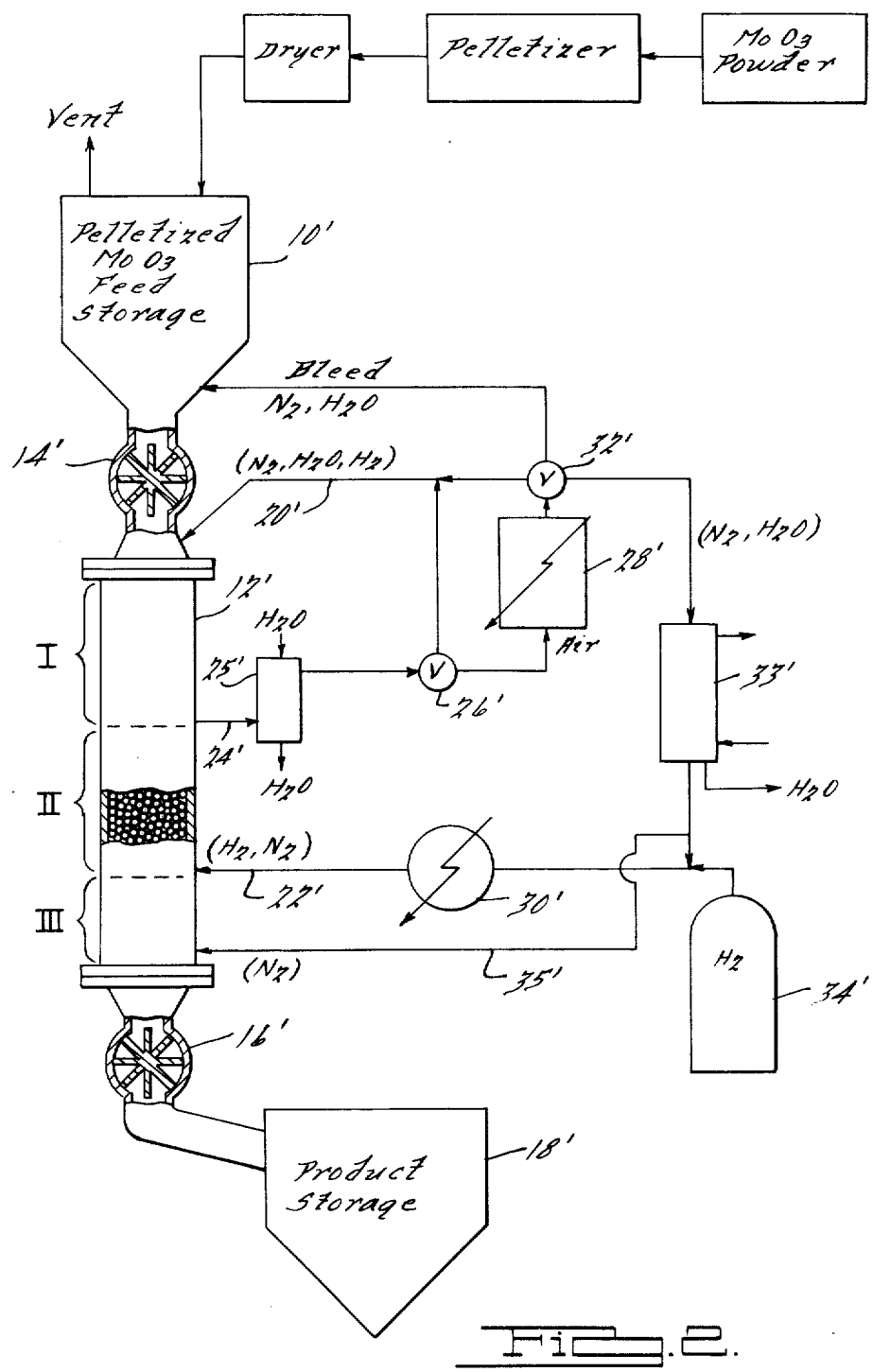
FIG. 2 comprises a schematic flow diagram of the reaction gases in accordance with an alternative embodiment of the invention.

In accordance with an alternative embodiment of the present invention, as depicted in the flow diagram comprising FIG. 2 of the drawings, a continuous direct reduction of molybdenum trioxide to metallic molybdenum is achieved by employing a co-current flow of the pelletized feed material and the reaction gas in zone I of the reactor and a countercurrent flow of the pelletized feed material and reaction gas in zone II of the reactor. The composition, configuration and size of the pelletized feed material and the composition and temperatures in the several zones of the reactor are controlled within the same parameters as previously described in connection with FIG. 1. The relationship of the components of the reactor and the feed and product storage systems are the same as previously described and like components have been designated by the same numeral with a prime affixed thereto.

As shown in FIG. 2, the pelletized molybdenum trioxide feed material passes downwardly from the storage hopper 10' through the star feeder 14' into the upper end of the reactor 12' and thereafter passes downwardly through reaction zones I, II and III, whereafter it is discharged at a controlled rate by the feeder mechanism 16' to the product storage hopper 18'.

In accordance with the alternative arrangement shown in FIG. 2, a heated reaction gas comprising a mixture of nitrogen, water vapor and hydrogen enters the upper end of the reactor above reaction zone I through supply line 20', which effects a heating of the cool pellets entering the reaction chamber in order to initiate the exothermic reduction reaction, which effects a corresponding rise in temperature of both the feed pellets and reaction gas. Typically, the reaction gas entering through supply line 20' may contain 7 mol percent hydrogen and is heated to a temperature of 680° C and controlled at a flow rate to provide a ratio of 32 mols gas for each mol of molybdenum trioxide feed. The reaction gas under the foregoing conditions effects a heating of the cooled pellets to a reaction temperature of about 630° C and the exothermic heat of reaction effects a heating of the porous pelletized bed and reaction gas to about 640° C. The first reaction gas and pellets travel downwardly through reaction zone I and the pelletized charge, upon reaching the upper end of reaction zone II, is contacted by a countercurrent flow of the second reaction gas introduced at the lower portion of zone II through supply line 22'. The reaction in zone II progresses in the same manner and under the same conditions as previously described in connection with FIG. 1.

The spent reaction gases from both zone I and zone II mix together at the juncture of zones I and II and are withdrawn through exhaust line 24' and are scrubbed in scrubber 25', whereafter they enter a proportioning valve 26' in which a portion thereof is recycled to supply line 20', while the balance thereof is introduced to a nitrogen generator 28' in admixture with a controlled quantity of air to provide a stoichiometric proportion of oxygen for residual unreacted hydrogen remaining therein. After combustion, the exhaust gases from the nitrogen generator 28' pass through the proportioning valve 32' and a portion thereof is transferred to supply line 20' in admixture with the recycled reaction gas supplied from proportioning valve 26' to form the first reaction gas mixture. The dilution of the recycled reaction gas with nitrogen and water vapor from the nitrogen generator is necessary in that the combined mixture of reaction gases withdrawn from the reactor through exhaust line 24' is higher in hydrogen than is required for the exothermic reduction reaction in zone I.

A small proportion of the effluent from the nitrogen generator 28' is transferred by the proportioning valve 32' as a bleed through the storage hopper 10', while the balance thereof is transferred through a condenser 33' in which the gas is chilled to effect a condensation of the major portion of water therein, which is removed and discharged to waste.

A small proportion of the effluent from the condenser 33', which is comprised predominantly of nitrogen, is transferred through supply line 35' to the lower portion of zone III, while the remainder thereof is admixed with make-up hydrogen from storage tank 34' and is heated by the heat exchanger 30' to the appropriate temperature, whereafter the hot reaction gas is introduced through supply line 22' into the lower portion of reaction zone II.

In order to further illustrate the present process, the following typical example is provided. It will be understood that the material and energy balance and the specific conditions employed in Example 1 are provided for illustrative purposes and are not intended to be limiting of the scope of the invention as herein described and as set forth in the subjoined claims.

EXAMPLE 1

A pelletized molybdenum oxide feed material is prepared employing a molybdenum oxide concentrate containing 98% by weight molybdenum trioxide and of an average particle size less than 147 microns by admixing in a pebble mill, 98.5% molybdenum trioxide concentrate, 1% $Fe_2O_3$ and ½% bentonite clay on a weight basis. A 50% aqueous solution containing molasses is prepared and the dryblended powder mixture is pelletized into spherical pellets of an average diameter of ⅜ inch employing about 7 pounds solution per 100 pounds of powder. After drying at 110° C, the pelletized feed material is charged in a continuous manner to a reactor and the following conditions are maintained based on 1 mol of molybdenum trioxide reduced per unit time. A reaction gas comprising 5 mols hydrogen and 5 mols nitrogen at a temperature of 1200° C is introduced into the lower portion of the second reaction zone through the supply line 22 and travels upwardly in a countercurrent fashion relative to the downwardly moving pelletized bed in accordance with the arrangement illustrated in FIG. 1. At the position indicated at X in the reactor corresponding substantially to the upper end of the second reaction zone, the reactant gas contains 5 mols nitrogen, 3 mols hydrogen and 2 mols water vapor and is at a temperature of 900° C. A diluent gas comprising 20 mols nitrogen and 11.1 mols water vapor at a temperature of 500° C is introduced through the supply line 20 into the lower end of the first reaction zone, providing a composite gas reaction mixture as measured at the location indicated at Y of the reactor in the flow diagram containing 25 mols nitrogen, 3 mols hydrogen and 13.1 mols water vapor at a temperature of 585° C. The reaction gas passes upwardly through the first reaction zone and the spent reaction gas removed from the upper end of the reactor through the exhaust line 24 contains 25 mols nitrogen, 2 mols hydrogen and 14.1 mols water and is at a temperature of 635° C. Eighty percent of the spent reaction gas is transferred by the proportioning valve 26 to the nitrogen generator 28 so as to provide 20 mols nitrogen, 1.6 mols hydrogen and about 11.3 mols water vapor. To this, air is admixed to provide a stoichiometric amount of oxygen; namely, 0.8 mols, for reaction with the hydrogen and 4 mols nitrogen. The combustion of the hydrogen constituent in the nitrogen generator produces 99,420 calories. The effluent from the nitrogen generator 28 is split by the proportioning valve 32 so as to transfer 20 mols nitrogen and 11.1 mols water vapor at a temperature of 500° C to the supply line 20; while 4 mols nitrogen and 1.8 mols water vapor are bled from the system for purging the feed hopper and thence to vent.

The remaining 20% of the spent reaction gases are transferred by the proportioning valve 26 to the condenser 33, in which 2.8 mols of condensed water are removed and the residual 5 mols nitrogen and 0.4 mols hydrogen are admixed with 4.6 mols make-up hydrogen, which enters the heat exchanger 30 in which 94,400 calories are added to heat the composite gas to 1200° C.

The resultant metallic molybdenum pellets are substantially devoid of any residual molybdenum oxide and are of a density of about 5.5 to about 6 grams per cubic centimeter (gm/cc). The iron oxide constituent employed in the binder is also reduced during the reduction reaction to metallic form.

In addition to the continuous two-stage reduction process as hereinabove described in connection with FIGS. 1 and 2, the present invention also contemplates continuous single-stage reduction of a pelletized feed material utilizing a reactor incorporating zones I and III to effect a reduction of molybdenum trioxide to molybdenum dioxide, as well as a reactor incorporating zones II and III to effect a reduction of a pelletized molybdenum dioxide feed to substantially metallic molybdenum. The single-stage reduction processes are schematically illustrated in the flow diagrams comprising FIGS. 3–5.

FIG. 3 depicts a countercurrent flow of feed material and gases through reaction zone I, while FIG. 4 depicts a co-current flow of feed material and gases in reaction zone I. FIG. 5 depicts a continuous countercurrent flow of feed material and gases through reaction zone II, which generally corresponds to the reaction conditions present in reaction zone II of the arrangements illustrated in FIGS. 1 and 2 of the drawings.

The reaction conditions present in reaction zone I and in reaction zone II of the single-stage reduction processes illustrated in FIGS. 3–5 are controlled within the same permissible ranges and for the same considerations as previously described in connection with reaction zones I and II, respectively, of the two-stage process depicted in FIGS. 1 and 2. Accordingly, in the single-stage process illustrated in FIGS. 3 and 4, the temperature within reaction zone I is controlled from about 580° C to about 650° C, and preferably within a range of about 600° C to about 640° C, and the reaction gas comprises a mixture of an inert carrier gas containing hydrogen in stoichiometric excess of that required with the concentration of hydrogen generally ranging from about 3 mol percent up to about 10 mol percent, and preferably from about 5 mol percent to about 7 mol percent. The molar ratio of hydrogen to the molybdenum trioxide present in the feed material may range up to 10:1, and preferably is controlled within a range of about 1.5:1 to about 3:1. In reaction zone II, on the other hand, the temperature is controlled above about 900° C, and preferably is maintained within a range of about 1100° C to about 1300° C. The reaction mixture gas mixture also comprises an inert carrier gas of the type previously described, with the concentration of hydrogen ranging above about 20 mol percent up to about 80 mol percent, and preferably within a range of about 40 mol percent to about 60 mol percent. The flow rate of the reaction gas is controlled so as to provide a stoichiometric excess of hydrogen to effect a reduction of the molybdenum dioxide in the feed material to metallic molybdenum and the stoichiometric ratio of hydrogen to molybdenum dioxide is preferably maintained within a ratio of about 2:1 up to about 4:1.

The pelletized feed material introduced into the upper end of reaction zone I of the arrangements illustrated in FIGS. 3 and 4 corresponds to that utilized as the feed for the two-stage reduction reaction previously described. The molybdenum dioxide pelletized feed material introduced into the upper end of reaction zone II of FIG. 5 may comprise a pelletized molybdenum dioxide material such as derived from the single-stage process of FIGS. 3 and 4 or may comprise a particulated molybdenum dioxide material which is agglomerated into pellets employing suitable binders of the same type as previously described in connection with the pelletized molybdenum trioxide feed material.

The following examples provide typical material and energy balances and processing conditions suitable for use in the continuous single-stage reduction reactions which are merely illustrative and are not intended to be construed as restrictive of the scope of the invention as herein described and as set forth in the subjoined claims.

EXAMPLE 2

Referring to FIG. 3, a pelletized molybdenum trioxide feed material of the same type employed in Example 1 is introduced into the upper end of a single-stage reactor 36 through a suitable paddle or star-type feeder (not shown). The pellets are at ambient temperature (25° C) and pass downwardly through reaction zone I in a countercurrent manner with respect to the reaction gas. The numerical values of the several gas streams set out in FIG. 3 are in terms of pound mols and are based on one hour of reactor operation to produce one pound mol of molybdenum dioxide product based on one pound mol of molybdenum trioxide in the feed material.

During the downward movement of the pelletized feed material through reaction zone I, the molybdenum trioxide constituent is converted to molybdenum dioxide, whereafter the partially reduced molybdenum dioxide pellets enter the cooling or stabilization zone III in which they are contacted with a nonoxidizing cooling gas in a countercurrent fashion and are discharged from the base of the reactor at ambient temperature (25° C) through a suitable star or paddle-type feeder mechanism (not shown) to product storage. The nonoxidizing cooling gas is introduced into the lower portion of the reactor through a feed line 38 and consists of 0.1 mol hydrogen and 2.5 mols nitrogen at a temperature of 25° C as derived from the outlet of a condenser 40. The reaction gas comprising 2 mols hydrogen, 19.5 mols nitrogen and 8 mols water vapor at a water temperature of 585° C is introduced through a supply line 42 into the lower region of reaction zone I and in admixture with the upwardly moving nonoxidizing gas stream from stabilization zone III. A typical analysis of the composite reaction gas stream within the reaction bed at the location indicated in FIG. 3 comprises 2.1 mols hydrogen, 22 mols nitrogen, 8 mols water vapor, which is at a temperature of 585° C.

The spent reaction gas is withdrawn from the upper portion of the reactor through an exhaust line 44 and consists of 1.1 mols hydrogen, 22 mols nitrogen and 9 mols water vapor and is at a temperature of 635° C. The spent reaction gases pass into a heat exchanger 46 in which they are cooled to 585° C, whereafter the cooled, spent reaction gas passes through a proportioning valve 48, whereby approximately 90% thereof is recycled to supply line 42 in combination with 1 mol of make-up hydrogen, with the remainder passing through the condenser 40 in which a further cooling thereof is effected to ambient temperature and 1 mol of water condensate is removed.

EXAMPLE 3

Referring to FIG. 4, a single-stage reactor 50 is provided defining reaction zone I and stabilization zone III, to the upper end of which a molybdenum trioxide pelletized feed is introduced in the same manner as previously described in connection with Example 2. A reaction gas at a temperature of 585° C consisting of 2.1 mols hydrogen, 22 mols nitrogen and 8 mols water vapor is introduced into the upper end of the reactor through a supply line 52. The reaction gas passes in a co-current manner downwardly together with the pelletized reaction bed and is withdrawn at the base of zone I through an exhaust line 54. A nominal analysis of the reaction gas at a point adjacent to the bottom of reaction zone I, as indicated in FIG. 4, is 1.1 mols hydrogen, 22 mols nitrogen and 9 mols water vapor and is at a temperature of 635° C. The spent reaction gases comprising a composite of the reaction gas introduced through supply line 52 and the nonoxidizing cooling gas introduced through a supply line 56 at the base of the reactor nominally contains 1.2 mols hydrogen, 24.8 mols nitrogen and 9 mols water with vapor and is at a temperature of 635° C. The spent reaction gases pass through a proportioning valve 58, whereby approximately 10% is transferred to a condenser 60 to effect a cooling thereof to about ambient temperature and a removal of one mol of water condensate therefrom. The cooled gas stream is recycled through the supply line 56 to the base of stabilization zone III to effect a cooling of the molybdenum dioxide pellets to ambient temperature at which they can be discharged in a manner as previously described. The balance of the spent reaction gases are transferred by the proportioning valve 58 to a heat exchanger 62 in which they are cooled to 585° C, whereafter one mol of make-up hydrogen is admixed therewith and the resultant composite stream is recycled to the reactor via supply line 52.

As in the case of Example 2, the flow rates, quantities and temperatures indicated in FIG. 4 are based on one hour of operation for producing one pound mol of molybdenum dioxide from one pound of molybdenum trioxide in the feed material.

EXAMPLE 4

Referring to FIG. 5, the continuous countercurrent single-stage reduction of a molybdenum dioxide feed material to substantially metallic molybdenum is illustrated and includes a reactor 64 defining an upper reaction zone II and a cooling or stabilization zone III. A molybdenum dioxide pelletized feed material at ambient temperature (25° C), such as derived from the processes of Examples 2 or 3, is introduced into the upper end of reaction zone II through a suitable star-type feeder mechanism (not shown). A reaction gas at 1200° C consisting of 4.6 mols hydrogen and 4.3 mols nitrogen is introduced adjacent the lower end of zone II through a supply line 66 and mixes with an upwardly moving nonoxidizing cooling gas introduced at the base of the reactor through a supply line 68. The nominal composition of the composite reaction gas mixture at a point indicated by the arrow in FIG. 5 consists of 5 mols hydrogen and 5 mols nitrogen and is at a nominal temperature of 1200° C.

The molybdenum dioxide feed material passes in a countercurrent fashion relative to the upwardly rising reaction gas stream during which the molybdenum dioxide constituent is reduced to metallic molybdenum. The reduced pellets enter the cooling or stabilization zone in which they are contacted in a countercurrent fashion by the cooling nonoxidizing gas consisting of 0.4 mols hydrogen and 0.7 mols nitrogen and are cooled to substantially ambient temperature (25° C), whereafter they are removed through a suitable paddle or star-type feeder mechanism (not shown) to product storage. The spent reaction gas is removed from the upper end of the reactor 64 through an exhaust line 70 and nominally comprises 3 mols hydrogen, 5 mols nitrogen and 2 mols water vapor and is at a temperature of 800° C. The spent reaction gas passes through a condenser 72 to effect a removal of substantially all of the water vapor therefrom comprising 2 mols, whereafter the cooled gas passes through a proportioning valve 74, whereby approximately 14% is recycled through supply line 68 into the base of cooling zone III, with the balance in admixture with 2 mols make-up hydrogen passing to a heat exchanger 76 in which the composite mixture is heated to a temperature of 1200° C. The heated reaction gas mixture thereafter is again introduced into the base of reaction zone II by supply line 66.

The flow rate of the pelletized feed and gas streams and the temperatures as hereinabove set forth and as indicated in FIG. 5 are predicated on one hour of reactor operation for producing one pound mol of metallic molybdenum based on one pound mol of molybdenum dioxide in the feed.

While the foregoing processes have been described in terms of employing the reaction gases for controlling the temperature of the pelletized reaction bed, it will be appreciated that the heating and cooling effects of the reaction gases can be supplemented to some extent by ancillary heating and cooling devices associated with the reactor. It will also be understood that the downward gravitational flow of the pelletized feed material through the reactor can be supplemented by mechanical devices including vibratory means and internal agitators to provide a uniform and continuous flow.

While it will be apparent that the invention herein described is well calculated to achieve the benefits and advantages as hereinabove set forth, it will be appreciated that the invention is susceptible to modification, variation and change without departing from the spirit thereof.

What is claimed is:

1. A continuous process for producing a product in which molybdenum is present in metallic form comprising the steps of agglomerating a particulated feed material composed predominantly of molybdenum trioxide into pellets, continuously introducing said pellets at a controlled rate into a reaction chamber defining a first reaction zone, heating said pellets to a first reaction temperature range of from about 580° C up to about 650° C in the presence of a first reaction gas comprised of an inert carrier gas containing from about 3 mol percent up to about 10 mol percent hydrogen, controlling the flow rate of said first reaction gas and said pellets to provide a stoichiometric excess of hydrogen in an amount greater than 1:1 up to about 10:1 mols hydrogen per mol molybdenum trioxide to effect an exothermic reduction of substantially all of the molybdenum trioxide in said pellets to molybdenum dioxide and to maintain the temperature of said pellets by substantially adiabatic means within said first reaction temperature range, continuously transferring the partially reduced said pellets at a controlled rate from said first reaction zone into a second reaction zone, heating said pellets to a second reaction temperature above about 900° C in the presence of a second reaction gas comprised of an inert carrier gas containing from about 20 mol percent up to about 80 mol percent hydrogen, controlling the flow rate of said reaction gas and said pellets to provide a stoichiometric excess of hydrogen to effect an endothermic reduction of substantially all of the molybdenum dioxide in said pellets to metallic molybdenum and to maintain the temperature thereof above about 900° C, continuously transferring the reduced said pellets at a controlled rate to a third zone containing a protective nonoxidizing atmosphere to effect a stabilization and cooling of said pellets and thereafter recovering the pelletized metallic molybdenum product.

2. The process as defined in claim 1, including the further step of orienting said reaction chamber in a generally upright direction and introducing said pellets into the upper end of said chamber and introducing the reaction gases into the lower portions of said chamber for upward flow through the porous bed of said pellets in a countercurrent fashion.

3. The process as defined in claim 1, in which the step of maintaining the temperature of said pellets within said first reaction temperature range is performed by maintaining the composition, temperature and flow rate of said first reaction gas substantially constant and by varying the rate at which said pellets are introduced into the reaction chamber in response to the temperature of said pellets and said reaction gas therein.

4. The process as defined in claim 1, in which the step of agglomerating the particulated feed material into pellets is performed so as to produce pellets of a generally spherical configuration of a size ranging from about ⅛ inch up to about ¾ inch diameter.

5. The process as defined in claim 1, in which the step of agglomerating the particulated feed material is performed so as to produce pellets of a substantially spherical configuration of a size ranging from about ⅜ inch up to about ⅝ inch diameter.

6. The process as defined in claim 1, including the further step of providing said feed material which is of a particle size less than about 100 mesh and contains upwards of 90% by weight molybdenum trioxide.

7. The process as defined in claim 1, in which the step of agglomerating the particulated feed material is performed by blending about 97% up to about 99¼% of said feed material with from about ½% to about 2%

$Fe_2O_3$, and about ¼percent up to about 1% bentonite clay to which an aqueous solution containing molasses is added in an amount sufficient to produce pellets having adequate shape-retaining green strength.

8. The process as defined in claim 7, in which the quantity of $Fe_2O_3$ is controlled at about 1% and the quantity of bentonite clay is controlled at about ½%.

9. The process as defined in claim 1, in which said first reaction temperature range is controlled from about 610° C to about 630° C.

10. The process as defined in claim 1, in which said second reaction temperature is controlled within a range of from about 1100° C to about 1300° C.

11. The process as defined in claim 1, in which said first reaction gas is composed of a mixture of nitrogen, water vapor and hydrogen.

12. The process as defined in claim 1, in which said second reaction gas is comprised of a mixture of nitrogen and hydrogen including water vapor as a gaseous reduction reaction product.

13. The process as defined in claim 1, in which said first reaction gas is comprised of a mixture of nitrogen, hydrogen and water vapor and is derived from a dilution of the second reaction gas passing into the first reaction zone with nitrogen and water vapor.

14. The process as defined in claim 1, in which a portion of the spent reaction gases removed from the upper end of the first reaction zone containing unreacted hydrogen are admixed with a stoichiometric amount of air in relationship to the amounts of hydrogen and oxygen present, respectively, to produce water and are burned to produce an inert carrier gas composed of the nitrogen and water vapor of which a portion is returned to said reaction chamber.

15. The process as defined in claim 1, in which a portion of the spent reaction gases are recovered from the upper end of the first reaction zone and are subjected to a further condensing step to extract the predominant proportion of water vapor therefrom and the effluent from said condenser is admixed with make-up hydrogen to form said second reaction gas.

16. The process as defined in claim 14, wherein a portion of said inert diluent gas composed of nitrogen and water is bled from the system.

17. The process as defined in claim 1, in which the step of stabilizing and cooling said pellets is performed in a manner to reduce their temperature below about 200° C before their removal from the protective atmosphere.

18. A continuous process for producing molybdenum dioxide comprising the steps of agglomerating a particulated feed material composed predominantly of molybdenum trioxide into pellets, continuously introducing said pellets at a controlled rate into a reaction chamber defining a reaction zone, heating said pellets to a reaction temperature range of from about 580° C up to about 650° C in the presence of a reaction gas comprised of an inert carrier gas containing from about 3 mol percent up to about 10 mol percent hydrogen, controlling the flow rate of said reaction gas and said pellets to provide a stoichiometric excess of hydrogen in an amount greater than 1:1 up to about 10:1 mols hydrogen per mol molybdenum trioxide to effect an exothermic reduction of substantially all of the molybdenum trioxide in said pellets to molybdenum dioxide and to maintain the temperature of said pellets by substantially adiabatic means within said reaction temperature range, continuously transferring the partially reduced said pellets at a controlled rate from said reaction zone to a cooling zone containing a protective nonoxidizing atmosphere to effect a stabilization and cooling of said pellets and thereafter recovering the pelletized molybdenum dioxide product.

19. The process as defined in claim 18 including the further step of orienting said reaction chamber in a generally upright direction and introducing said pellets into the upper end of said chamber and introducing the reaction gas into the lower portions of said chamber for upward flow through the porous bed of said pellets in a countercurrent fashion.

20. The process as defined in claim 18 in which said pellets and said reaction gas pass in a co-current manner through said reaction zone.

21. The process as defined in claim 18, in which the step of agglomerating the particulated feed material into pellets is performed so as to produce pellets of a generally spherical configuration of a size ranging from about ¼ inch up to about ¾ inch diameter.

22. The process as defined in claim 18, in which said reaction temperature range is controlled from about 610° C to about 630° C.

23. The process as defined in claim 18, in which said reaction gas is composed of a mixture of nitrogen, water vapor and hydrogen.

24. The process as defined in claim 18, in which a portion of the spent reaction gas is recovered from the upper end of the reaction zone and is subjected to a further condensing step to extract the predominant proportion of water vapor therefrom and the effluent from said condenser is admixed with make-up hydrogen to form said reaction gas.

25. The process as defined in claim 18, in which the step of stabilizing and cooling said pellets is performed in a manner to reduce their temperature below about 200° C before their removal from the protective atmosphere.

26. The process as defined in claim 18, in which the step of maintaining the temperature of said pellets within said reaction temperature range is performed by maintaining the composition, temperature and flow rate of said reaction gas substantially constant and by varying the rate at which said pellets are introduced into the reaction chamber in response to the temperature of said pellets and said reaction gas therein.

* * * * *